Nov. 10, 1964 W. R. SIMONS 3,156,121
DAMPING DEVICES
Filed Aug. 21, 1961 2 Sheets-Sheet 1
FIG. 1.
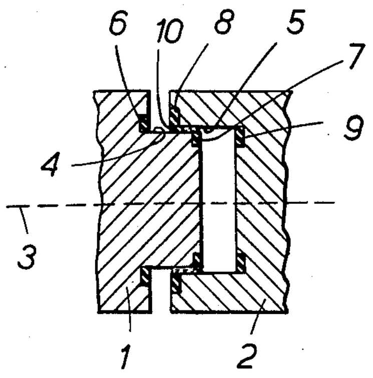
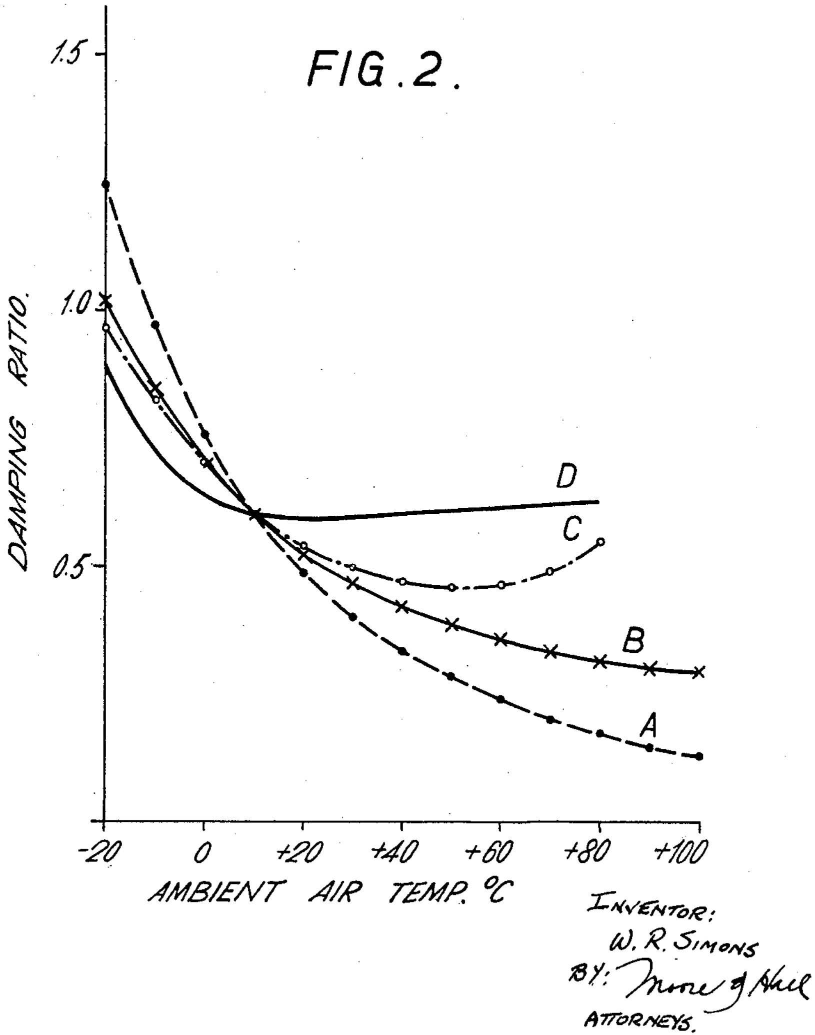
FIG. 2.
INVENTOR:
W. R. SIMONS
BY: Moore & Hall
ATTORNEYS.

Nov. 10, 1964 W. R. SIMONS 3,156,121

DAMPING DEVICES

Filed Aug. 21, 1961 2 Sheets-Sheet 2

INVENTOR:
W. R. SIMONS
BY: Moore & Hall
ATTORNEYS.

United States Patent Office 3,156,121
Patented Nov. 10, 1964

3,156,121

DAMPING DEVICES

William Richard Simons, Cheltenham, England, assignor to S. Smith & Sons (England) Limited, London, England, a British company Filed Aug. 21, 1961, Ser. No. 132,662
Claims priority, application Great Britain July 3, 1961
16 Claims. (Cl. 74—5.5)

The present invention relates to damping devices and in particular to devices for damping the motion of rotary shafts.

In many instruments and other apparatus, there are provided rotary shafts, the angular position of which is utilized to provide a signal representing the magnitude of some variable. For example, in measuring instruments it is common for a pointer to be mounted on a shaft for rotation relative to a fixed scale, the shaft being caused to rotate in accordance with the magnitude of a variable to be indicated. In other instruments, for example rate gyroscopes, a shaft rotates in accordance with some quantity being sensed by the instrument and provides a signal representing the magnitude of the quantity, an electrical pick-off being provided, for example, to generate an electrical signal representing the angular position of the shaft. In more complex apparatus, for example in servo mechanisms, rotary shafts are driven in accordance with the magnitude of some variable to provide a signal for application to other parts of the apparatus. It is common for the motion of such a shaft to be subject to restraint by one or more springs and it may then become necessary to damp the motion of the shaft in order to prevent or reduce the occurrence of transient oscillations. Damping may also be required in other cases where there is no spring restraint but in which transient oscillations may arise from other causes.

Many forms of damping device have already been proposed but all appear to have one or more disadvantages where the device is required to have a combination of properties, namely that it shall be simple to manufacture, small, robust and reliable during prolonged periods of operation and at the same time that it shall have operating characteristics which, if not invariant, vary comparatively slightly with variation of temperature, at least within a given range of temperature.

Damping devices are well known in which use is made of the resistance to motion arising from the viscosity of a liquid, but known devices of this kind have features which are inconsistent with the requirements set out above. For example, there is the question of providing efficient and durable liquid seals. Again, many of the known devices, for example paddle dampers, are of considerable size and complexity, especially if the temperature of the liquid is to be allowed to vary appreciably in operation since expansion chambers or the like then have to be provided. Alternatively some form of heater and thermostatic control is required to maintain the temperature of the liquid more or less constant, this adding to the bulk and complexity of the device besides introducing potential sources of failure in operation. Again, if the operating characteristics are to remain constant with varying temperature, should there be no temperature control, some way must be found of compensating for the variation of the viscosity of the liquid with temperature and this becomes more difficult if there is a relatively large body of liquid as for example in the case of a rate gyroscope the gimbal structure of which is totally immersed in a body of viscous liquid.

According to the present invention a device for damping the motion of a rotary shaft comprises first and second members each providing one of a pair of cyilndrical surfaces which are both coaxial with the shaft, one at least partially surrounding the other but being spaced from it by a small amount, the first member being mounted for rotation with the shaft and the second member being fixed relative to the shaft, and means for confining a body of liquid to at least a part of the space between the cylindrical surfaces, said means comprising bodies of material having the property that its surface is not readily wetted by the liquid concerned which bodies are mounted in or on surfaces of the first and second members (or on adjacent surfaces of other members integral with or joined to the said members) so as to prevent the escape of liquid from the required space without there being any physical contact between relatively movable parts, the body of liquid being provided to damp the motion of the shaft by reason of the viscous forces arising on rotataion of the shaft, and the temperature co-efficients of expansion of the first and second members being such that the change in the dimensions of the gap between the cylindrical surfaces compensates, at least in part, for any change in the viscosity of the liquid with temperature within a predetermined range of temperatures.

Further, according to the present invention there is provided an instrument or apparatus including a rotary shaft, means for causing rotary motion of the shaft, and a damping device as set out in the previous paragraph for damping the rotary motion of the shaft. In particular, the apparatus may be a rate gyroscope, the shaft being that about which the gyroscope precesses on being subjected to rotation about an axis at right angles to that of the shaft.

According to a feature of the present invention, a rate gyroscope is provided with a damping device according to the present invention for damping the rotary motion of the shaft about which it precesses on being subjected to rotation about an axis at right angles to that of the shaft, the body of liquid being the only body of liquid provided for the purpose of damping the motion of the shaft and being small in comparison with the bulk of the gyroscope itself, and the first member being metallic.

Either the first or the second member may be provided with an external cylindrical surface, the other member being provided with an internal cylindrical surface.

Preferably, the liquid is a silicone fluid which, depending on its constitution, may typically have an approximately linear viscosity/temperature characteristic over a temperature range of say 0–100° C. the slope of the characteristic over this range being small when compared with that of other liquids. Where a silicone fluid is employed, the cylindrical member is preferably constructed of aluminium or an alloy of aluminium or magnesium and the fixed member of a nickel-iron alloy of the special type sold under the trade names "Invar" and "Nilo" having a very small temperature co-efficient of expansion, for example the alloy "Nilo 36" containing 36% nickel. Using these materials, the gap between the surfaces may for example vary between 0.001" and 0.003", the viscosity of the fluid from 500 to 12,500 cs.

In the case of a body of silicone fluid the means for confining the body of liquid in said space preferably comprises rings of polytetrafluorethylene mounted opposite one another in the surfaces of the first and second members at each end of the part of the space to which it is desired to confine the body of liquid. These rings are spaced apart but the liquid is unable to escape owing to surface tension effects. The rings may also, where convenient, be mounted on or in the adjacent surfaces of members integral with or joined to the first and second members. Alternatively areas of polytetrafluorethylene may be sprayed on to appropriate areas of the surfaces concerned.

Devices according to the present invention may, of course, find application in any instrument or apparatus in which it is required to damp the motion of a rotary shaft. However, one form of instrument in which it is particularly useful, is a rate gyroscope that is to say a gyroscope which has only one degree of freedom and is subject to spring restraint about its precessional axis so that any precession about this axis is proportional to the rate of rotation of a body on which the gyroscope is mounted, about an axis perpendicular both to the one axis and the axis of rotation of the gyroscope rotor. In constructing small rate gyroscopes which are sensitive to small rates of rotation and are yet required to operate under a comparatively wide range of environmental conditions, a considerable problem arises in providing a damping device for the shaft the rotation of which represents the output signal of the gyroscope which device is compact and comparatively insensitive to temperature changes over a reasonably wide range of temperatures. This problem becomes the more acute when requirements such as simplicity, ease of manufacture and maintenance and durability in service, are also added. Using a device according to the present invention, in which the body of liquid is a silicone fluid the first member is of aluminium, and the second member one of the nickel-iron alloys referred to above, it has been found possible to provide a rate gyroscope in which the damping ratio (i.e. the ratio of the actual damping factor to that for critical damping) is required to be about 0.6 and in fact lies within the range 0.595–0.635 over the range of ambient temperatures 0–90° C.

An example of a damping device according to the present invention and of a rate gyroscope according to the feature of the present invention will now be described with reference to the accompanying drawing in which:

FIGURE 1 shows an axial section through a simplified form of the device.

FIGURE 2 shows a graph illustrating the properties of the device shown in FIGURE 1.

Figure 3:
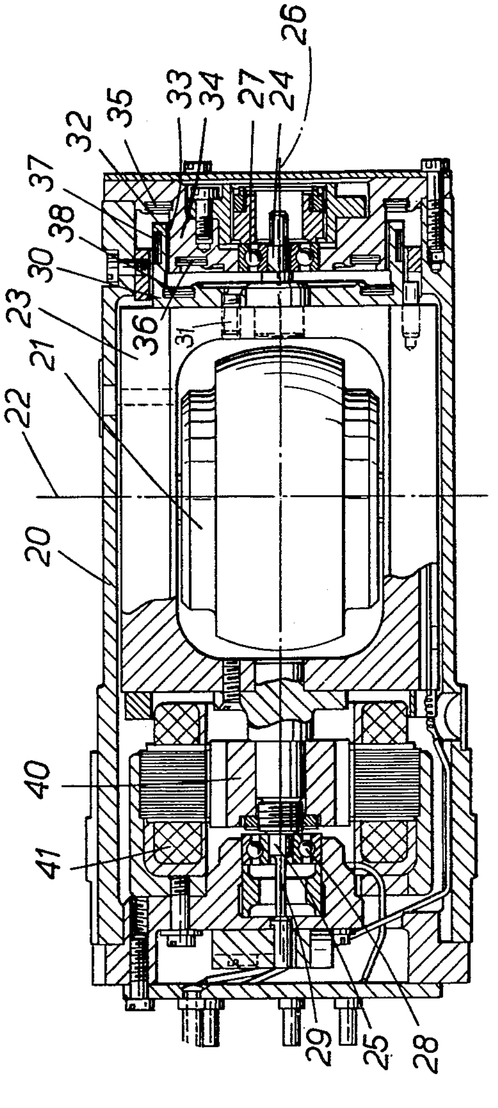
FIGURE 3 shows a section through a miniature rate gyroscope including an example of a damping device according to the invention.

Referring first to FIGURE 1, the device which is shown in simplified form, comprises a pair of members 1 and 2, both of which are of generally cylindrical form, having a common axis 3. One of the members 1 and 2 is mounted for rotation about the axis 3 with the rotary shaft, the motion of which is required to be damped, the other one being fixed. Which of the members 1 and 2 is fixed and which rotates is immaterial but it will be assumed for the purposes of description that the member 1 is the one which rotates, being mounted on one end of the rotary shaft.

The member 1 has an external cylindrical surface 4 part of which is surrounded by part of an internal cylindrical surface 5 of slightly greater radius provided on the member 2. Rings 6, 7, 8 and 9 of polytetrafluorethylene are provided in the surfaces of the members 1 and 2 in positions such that the opposed parts of the surfaces 4 and 5 lie between surfaces of the rings 6–9 (one is here considered only the external surfaces of the members 4 and 5 and not the relative positions of the various surfaces in space).

The member 1 is constructed of aluminium or an alloy of aluminium or magnesium, for example the aluminium alloy sold under the trade name "Duralumin," and the member 2 of one of the nickel-iron alloys, sold for example under the trade names "Invar" and "Nilo," which have a relatively small coefficient of thermal expansion. For example, the member 1 may have a linear expansion of the co-efficient of about $23\times10^{-6}/°$ C. and the member 2 a co-efficient of $1\times10^{-6}/°$ C.

A body of silicone fluid 10 is introduced into the annular gap between the opposed parts of the surfaces 4 and 5 either by painting it on to the appropriate parts of the surfaces before assembling the device or by any other convenient method. The fluid may for example be a silicone fluid of type MS. 200 sold by Midland Silicones Ltd. or their equivalent, and is confined to that space by surface tension effects, polytetrafluorethylene having the property that its surface is not readily wettted by silicone fluids. The bodies of polytetrafluorethylene should be positioned as close to the opposed parts of the surfaces 4 and 5 as possible. In this connection, spraying areas of polytetrafluorethylene on to the metal surfaces instead of fitting inserts may be more convenient.

The damping obtained which may be expressed as the damping ratio, i.e. the ratio of the actual damping factor to the critical damping factor, is given by:

$$\xi=\frac{C}{2\sqrt{IK}} \qquad (1)$$

assuming the motion about the axis 3 to be damped simple harmonic motion of a body having a moment of inertia I about the axis 3, where K is the stiffness constant of the restraining spring (restoring torque per unit angular deflection) and C is the damping constant (viscous torque per unit angular velocity). Theoretically, the damping constant C is given approximately by:

$$C=\frac{\pi\nu r^3 l\rho}{50t} \qquad (2)$$

where $\nu$ is the viscosity of the liquid in centistokes, $r$ is the mean radius of the gap in inches, $l$ is the axial length of the opposed parts of the surfaces 4 and 5 in inches, $\rho$ is the absolute density of the liquid in pounds per cubic inch and $t$ is the gap thickness in inches, C being in lb. ins./radian per sec.

For a given instrument or system, I and the required value of $\xi$ will usually be known, so that C can be determined from Equation 1, once K is determined, that is once the stiffness of the spring restraint is determined. Once the required value of C is known, the dimensions of the damping device and the properties of the liquid used can be determined from Equation 2.

When considering the effects of varying temperature in a given case, the viscosity/temperature characteristic of the liquid must be known and the effect of temperature on the gap dimension $t$ must be calculated from the expansion co-efficients of the materials of which the members 1 and 2 are made. Doing this and applying the theoretical relationships of Equations 1 and 2 to a particular case, a series of curves as shown in FIGURE 2 is obtained, these being graphs relating the damping ratio to the ambient temperature for a case in which the mean diameter of the gap between the surfaces 4 and 5 is 0.875", the length of overlap of the surfaces 4 and 5 is 0.183", the member 1 is constructed of an aluminium alloy such as Duralumin and the member 2 of a nickel-iron alloy containing 36% nickel. The fluid employed is a silicone fluid MS. 200. In FIGURE 2, curve A is, for purposes of comparison, for a case in which there is no compensation, the members 1 and 2 being of the same metal. Curves B and C are for cases in which the gaps between the surfaces 4 and 5 are respectively 0.0015" and 0.0010", the viscosity of silicone fluid being 1000 centistokes in the first case and 625 centistokes in the second. It will be noted that a lower viscosity is required in the second case as the gap is smaller, inspection of Equation 2 showing that the damping constant is proportional to $\nu/t$, all other factors remaining constant. Thus if the same damping constant is required the viscosity will decrease if the gap does. From the two curves B and C, it will be seen that a case intermediate between the two could, theoretically be expected to provide a curve showing the least variation of damping ratio with temperature over the range 0–100° C. As the gap between the surfaces 4 and 5 is decreased, the effect of the greater expansion of the member 1 with temperature which reduces the effective size of the gap as the temperature increases, becomes more pronounced so that, in the curve C, there is a minimum and the damping ratio in fact increases again at higher temperature.

As mentioned previously, damping devices according to the present invention are particularly suitable for use in miniature rate gyroscopes, for use for example in automatic control systems for aircraft or navigational systems. FIGURE 3 therefore shows a cross section through a typical rate gyroscope according to the feature of the invention. The gyroscope has a case 20, the overall size of which is 3" in length and 1.375" in diameter. The gyroscope has an electric motor, the rotor 21 of which is mounted for rotation about an axis 22 with respect to a gimbal structure 23. The structure 23 has spindles 24 and 25 at opposite ends supporting it for rotation about an axis 26. The spindle 24 is supported by a ball bearing 27 and the spindle 25 by a ball bearing 28. The rotary motion of the gimbal structure 23 and the spindles 24 and 25 (which three elements can together be considered to constitute a rotary shaft) about the axis 26 is subject to spring restraint provided by a torsion bar 29 one end of which is joined to the spindle 25 and the other end of which is clamped to part of the casing 20.

An electromagnetic pick-off, having a rotor 40 and a stator 41 respectively mounted on the spindle 25 and the casing 20, is provided for the generation in known manner of an A.C. electrical signal the magnitude and phase of which represent any angular displacement of the shaft from a datum position. As is well known, such displacement will occur if the gyroscope is subjected to rotation about an axis perpendicular to both the axes 22 and 26, the extent and sense of the angular displacement being dependent on the rate and sense of rotation.

Various electrical connections for the gyroscope motor and the pick-off, cover plates, screws and other items are shown in FIGURE 3 but will not be described in detail here as their function is not relevant to the invention.

A damping device according to the present invention is provided to damp the motion of the gimbal structure 23 about the axis 26. This comprises a first member 30 which is secured by screws 31 (only one is shown in FIGURE 3) to the main body of the gimbal structure 23, and thus rotates with it about the axis 26. The member 30 has an internal cylindrical surface 32, the longitudinal axis of which coincides with the axis 26. This surrounds but is spaced from a part of a coaxial external cylindrical surface 33 provided on a second member 34 which is secured to and effectively forms part of the casing 20. The member 34 in fact carries the fixed part of the bearing 27 which supports the spindle 24. The annular gap between the surfaces 32 and 33 contains a body of silicone fluid, which is confined to the gap by rings 35–38 of polytetrafluorethylene. Whilst the rings are spaced some distance from the gap, it is found that the bulk of the liquid is confined to it, only a thin film covering over the surfaces between the gap and the surfaces of the rings 35–38.

In a typical case, the moment of inertia I of the gimbal structure about the axis 26 was found to be 113 gm. cm.$^2$ and K the stiffness constant of the torsion bar 29 was 553 gm. cms./radian. In the case of a rate gyroscope for a given maximum angular deflection, for example $\pm 2°$ from the null, K will vary directly as the maximum angular velocity to be measured and in the present case the maximum rate is taken as $\pm 6°$/sec. The damping ratio $\xi$ required was 0.6 at 20° C. (it will be appreciated that any desired value of $\xi$ may be chosen), so that C as calculated from Equation 1 is required to be 0.0083 lb. ins./radian per sec.

The relevant dimensions of the damping device at 20° C. were as follows:

| | |
|---|---|
| Mean diameter of gap ______________inches__ | 0.875 |
| Effective length _____________________do____ | 0.183 |
| Specific gravity of silicone fluid ______________ | 0.97 |
| Thickness of gap _________________inches__ | 0.0015 |

Using Equation 2, the value for the viscosity of the fluid may then be calculated to be 925 centistokes. In fact a silicone fluid (MS. 200) having a viscosity of 1000 cs. was employed, this being more convenient. FIGURE 2, curve D, shows a graph giving the relation actually found by experiment between the damping ratio and temperature. The members, 30 and 34 were respectively of "Invar" and "Duralumin." This curve is shifted to the left as compared with curves A–C owing to the increase of fluid temperature resulting from operation of the gyroscope motor. This is estimated to be about 20° C.

If it is required to vary the maximum angular velocity to which the gyroscope responds, K has to be varied and this variation, assuming $\xi$ is to be maintained constant, can be met by increasing the viscosity of the liquid. For example, in the case of a gyroscope in which the maximum detectable rate is required to be 40°/second, the viscosity would theoretically be 2400 centistokes but in practice with MS. 200 silicone fluids, one having a viscosity of 3000 centistokes is required owing to the decrease of viscosity with shear rate which is encountered with these fluids.

In the damping devices described above, certain specific materials have been cited as examples of materials suitable for particular purposes. Whilst these are the most suitable materials known to the applicants, it will be understood that the invention is not limited to the use of these particular materials. Certain basic requirements arise however. The liquid must have at least over a certain range of temperatures a viscosity/temperature characteristic such that the variation of its viscosity over a required temperature range is comparatively small. For example in the case of an MS. 200 silicone fluid having a viscosity of 350 centistokes at room temperature, the viscosity varies from 75 centistokes at 120° C. and 1,300 centistokes at −25° C. (by comparison an SAE. 30 motor oil has a viscosity of 6.6 centistokes at 120° C. and 70,000 centistokes at −25° C.). A comparatively slowly varying characteristic of this nature is required, if any degree of compensation is to be achieved over a significant range of temperatures. Otherwise such a wide difference of thermal expansion co-efficients is required, that a gap of the dimensions required to achieve a given damping constant, will be likely to close completely at the higher temperatures.

Again, aluminium, magnesium and alloys of these two metals have linear thermal expansion co-efficients of about $23 \times 10^{-6}/°$ C. or slightly higher. Other metals for example cadmium and tin have similar co-efficients but are hardly suitable for use in such a device. Similarly, the nickel-steel alloys such as "Invar" are the most suitable materials known, having a very low co-efficient. In any case with a silicone fluid, a metal having a co-efficient greater than $20 \times 10^{-6}/°$ C. is preferable for the member having the external cylindrical surface, and one having a co-efficient lying in the range 0.5–1.5 $\times 10^{-6}/°$ C. is preferred for the member with the internal surface. For the application to rate gyroscopes, or in other cases, where reliability during prolonged operation is required, the instability of known plastic materials renders them unsuitable for use, although in some cases they have suitably high co-efficients of expansion.

Whilst polytetrafluorethylene is not readily wetted by silicone fluids, other materials having the same property may be employed in its place, and a material having the same property will have to be employed if any other liquid is used.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

I claim:

1. A device for damping the motion of a rotary shaft comprising first and second members having first and second cylindrical surfaces respectively which surfaces are both coaxial with the shaft, one of said surfaces at least partially surrounding the other but being spaced from it by a small amount, the first member being mounted for rotation with the shaft and the second member being fixed relative to the shaft, a body of liquid occupying at least a part of the space between the cylindrical surfaces, said body of liquid being provided to damp the motion of the shaft by reason of the viscous forces arising on rotation of the shaft, and means for confining said body of liquid to said part of said space, said means comprising bodies of a material having the property that its surface is not readily wetted by the liquid concerned, at least two such bodies being provided in association with each member and between them bounding the whole of the cylindrical surface on the member concerned so as to prevent the escape of liquid from the required space without there being any physical contact between relatively movable parts, and the first and second members being constructed of materials having different temperature co-efficients of expansion, that of the member having the said one surface being smaller than that of the other member, the difference in said co-efficients being related to the change of viscosity of the liquid with temperature, at least partially to compensate for any change in the characteristics of the device arising from the said viscosity variation at least within a predetermined range of temperatures.

2. A device according to claim 1 in which the liquid is a silicone fluid and the said bodies are of polytetrafluorethylene.

3. A device according to claim 2 in which the member having the said one surface is constructed of a nickel-iron alloy containing 36% nickel, and the other member is constructed of a metal selected from the group comprising magnesium, aluminium and alloys of magnesium and aluminium.

4. A device according to claim 2 in which the member having the said one surface is constructed of a metal having a thermal co-efficient of expansion lying in the range $0.5\times10^{-6}$ to $1.5\times10^{-6}$ per degree centigrade and the other member is constructed of a metal having a thermal co-efficient of expansion greater than $20\times10^{-6}$ per degree centigrade.

5. A device for damping rotary motion of a shaft about its longitudinal axis, the device comprising a first member having a first surface which is an external cylindrical surface the longitudinal axis of which is coincident with said shaft axis, a second member having a second surface which is an internal cylindrical surface the longitudinal axis of which is also coincident with said shaft axis, the radius of the second surface being greater than that of the first surface, means supporting the first and second members for rotation relative to one another about said axes, means linking one of the first and second members to the shaft for rotation therewith, said support means positioning the first and second members with the first and second surfaces at least partially overlapping axially, a body of viscous liquid in the gap between the overlapping parts of the first and second surfaces and means for confining the liquid to said gap, said means comprising, one each member, a pair of rings of a material which is not wetted by the liquid, the rings of a pair each surrounding the said axes and being spaced apart axially along the surface of the member to include between them at least the overlapping part of the cylindrical surface, and the first and second members being constructed of materials having different temperature co-efficients of expansion, that of the second member being smaller than that of the first member, the difference in said co-efficients being related to the change of viscosity of the liquid with temperature, at least partially to compensate for any change in the characteristics of the device arising from the said viscosity variation at least within a predetermined range of temperatures.

6. A device according to claim 5 in which the liquid is a silicone fluid and the said rings are of polytetrafluorethylene.

7. A device according to claim 6 in which the second member is constructed of a nickel-iron alloy containing 36% nickel, and the first member is constructed of a metal selected from the group comprising magnesium, aluminium and alloys of magnesium and aluminium.

8. A device according to claim 6 in which the second member is constructed of a metal having a thermal co-efficient of expansion lying in the range $0.5\times10^{-6}$ to $1.5\times10^{-6}$ per degree centigrade and the first member is constructed of a metal having a thermal co-efficient of expansion greater than $20\times10^{-6}$ per degree centigrade.

9. A device according to claim 5 in which said rings are formed by annular inserts of said material having surfaces lying flush with the surface of the member concerned.

10. A device according to claim 5 in which said rings are formed by annular layers of materials deposited on the surface of the member concerned.

11. A rate gyroscope comprising a main casing, a gimbal casing mounted for rotation in the main casing about a first axis, means for exerting spring restraint acting against rotation of the gimbal casing about said first axis from a datum orientation, a gyroscope motor mounted within the gimbal casing and having a rotor mounted for rotation about a second axis at right angles to the first one and a damping device for damping rotary motion of the gimbal casing about the first axis, the device comprising a first member mounted on the gimbal casing and having a first cylindrical surface coaxial with said first axis, a second member mounted on the main casing and having a second cylindrical surface coaxial with said first axis, one of the first and second cylindrical surfaces being external and the other internal, the internal one being of greater radius than the external one and at least partially overlapping it axially, a body of viscous liquid in the gap between the overlapping parts of the first and second surfaces, the liquid being provided to damp the motion of the gimbal casing about the first axis and being the only body of liquid provided for that purpose, and means for confining the body of liquid to said gap, said means comprising, on each of the first and second members, a pair of rings of a material which is not wetted by the liquid, the rings of a pair each surrounding the first axis and being spaced apart axially along the surface of the member concerned to include between them at least the overlapping part of the cylindrical surface and the first and second members being constructed of materials having different temperature co-efficients of expansion, that of the member having the internal surface being smaller than that of the member having the external surface, the difference in said co-efficients being related to the change of viscosity of the liquid with temperature, at least partially to compensate for any change in the characteristics of the device arising from the said viscosity variation at least within a predetermined range of temperatures.

12. A device according to claim 11 in which the liquid is a silicone fluid and the said rings are of polytetrafluorethylene.

13. A device according to claim 12 in which the member having the internal surface is constructed of a nickel-iron alloy containing 36% nickel, and the member having the external surface is constructed of a metal selected from the group comprising magnesium, aluminium and alloys of magnesium and aluminium.

14. A device according to claim 12 in which the member having the internal surface is constructed of a metal having a thermal co-efficient of expansion lying in the range $0.5\times10^{-6}$ to $1.5\times10^{-6}$ per degree centigrade and the member having the external surface is constructed of a metal having a thermal co-efficient of expansion greater than $20\times10^{-6}$ per degree centigrade.

15. A device according to claim 11 in which said rings are formed by annular inserts of said material having surfaces lying flush with the surface of the member concerned.

16. A device according to claim 11 in which said rings are formed by annular layers of material deposited on the surface of the member concerned.

References Cited in the file of this patent

UNITED STATES PATENTS

| | | |
|---|---|---|
| 1,407,320 | Bouche | Feb. 21, 1922 |
| 2,780,940 | Brown | Feb. 12, 1957 |
| 2,859,624 | Carter | Nov. 11, 1958 |
| 2,876,643 | Schaberg | Mar. 10, 1959 |